(12) United States Patent
Von Mutius

(10) Patent No.: US 7,393,180 B2
(45) Date of Patent: Jul. 1, 2008

(54) WIND TURBINE IN PARKED POSITION

(75) Inventor: Martin Von Mutius, Ascheffel (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/499,289

(22) PCT Filed: Dec. 20, 2002

(86) PCT No.: PCT/EP02/14667

§ 371 (c)(1),
(2), (4) Date: Dec. 12, 2005

(87) PCT Pub. No.: WO03/054388

PCT Pub. Date: Jul. 3, 2003

(65) Prior Publication Data

US 2006/0099075 A1    May 11, 2006

(30) Foreign Application Priority Data

Dec. 20, 2001    (DE) ................................ 101 62 942

(51) Int. Cl.
*F04D 29/26* (2006.01)
(52) U.S. Cl. .................................. 416/132 B; 416/141
(58) Field of Classification Search ................. 416/131, 416/132 B, 136, 141, 46
See application file for complete search history.

(56) References Cited

U.S. PATENT DOCUMENTS 4,348,155 A * 9/1982 Barnes et al. .................. 416/46

FOREIGN PATENT DOCUMENTS

DE    19626402 C1 *    7/1997
EP    942168 A2 *    9/1999

OTHER PUBLICATIONS

Translation of DE 196 26 402 C1 to Siegfriedsen.*

* cited by examiner

*Primary Examiner*—Edward Look
*Assistant Examiner*—Dwayne J White
(74) *Attorney, Agent, or Firm*—Blakely, Sokoloff, Taylor & Zafman LLP

(57) ABSTRACT

The invention relates to a method for operating a wind power plant with a rotor and with at least two rotor blades rotatable about a common rotor axis in a rotor blade plane, whereof each can be swivelled about a swivel axis which is roughly parallel to its longitudinal axis approximately perpendicular to the rotor axis, in which the setting or pitch angels of the rotor blades are set with respect to the rotor blade plane as a function of the operating and in particular wind conditions, in which the pitch angels of at least two rotor blades in a parking position of the rotor, in which rotor rotation about the rotor axis is decelerated, are set to different values.

12 Claims, 8 Drawing Sheets

WIND TURBINE IN PARKED POSITION

Figure 1:
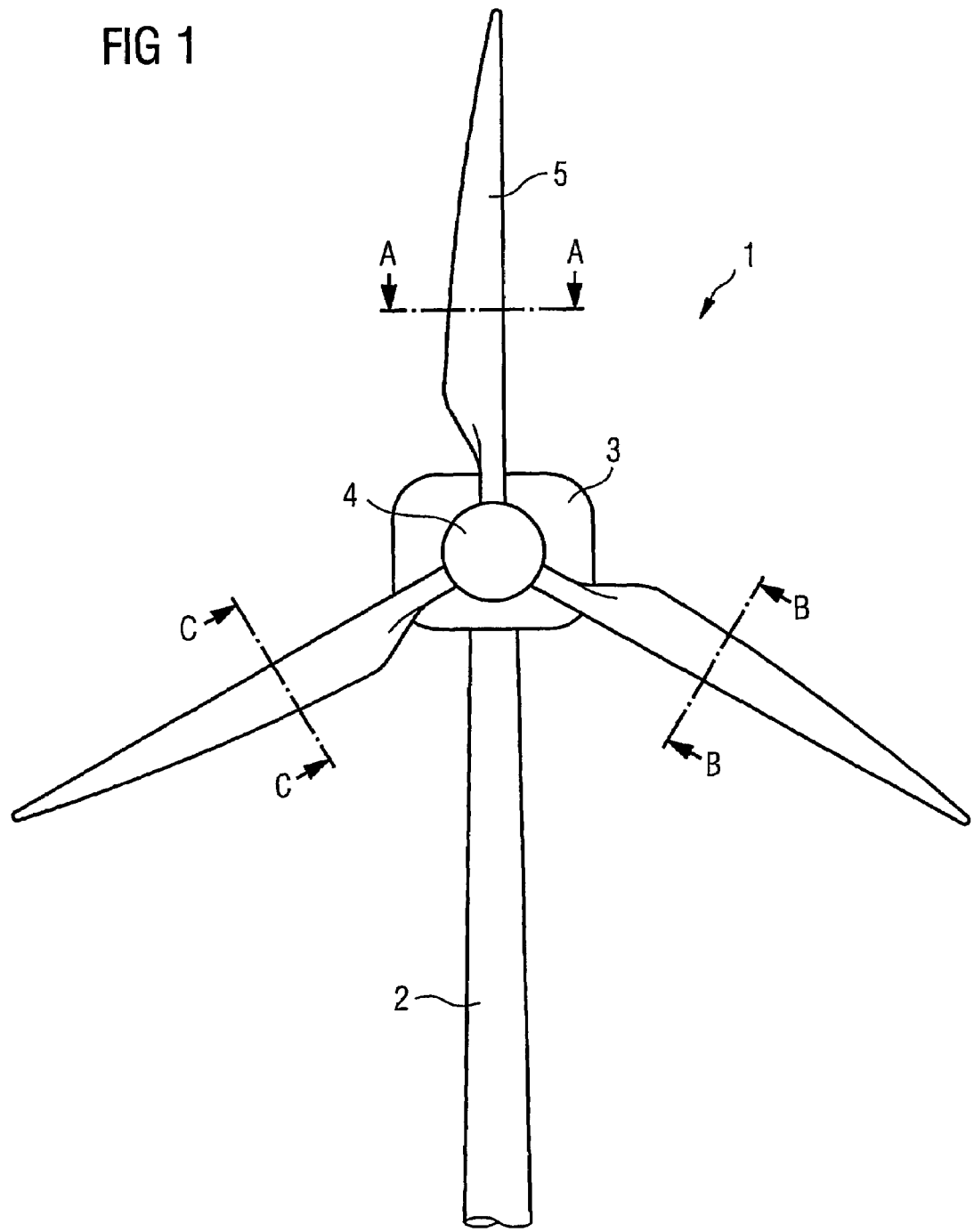

The invention relates to a method for operating a wind power plant with a rotor having at least two rotor blades rotatable in a rotor blade plane about a common rotor axis, whereof each can be swiveled about a swivel axis running roughly parallel to its longitudinal axis which is transverse, preferably approximately perpendicular to the rotor axis, in which the setting or pitch angles of the rotor blades are set with respect to the rotor blade plane by swiveling about a swivel axis as a function of the operating and in particular wind conditions, and to a wind power plant operated according to such a method.

Wind power plants, in general, comprise a tower, a nacelle at the tip of the tower rotatable around a rotation axis running essentially in the direction of gravity and a rotor rotatable around a rotor axis running essentially perpendicular to the direction of gravity. During operation of such wind power plants, the nacelle and therewith also the rotor blade plane can be rotated around the rotation axis running essentially in the direction of gravity to achieve optimal operating conditions at varying wind directions. The rotational speed of common wind power plants with fixed setting of pitch angles of the rotor blades in respect to the rotor blade plane is limited by the stall-effect.

To improve the operating options of wind power plants, it has already been suggested to achieve an adaptation to the direction of the wind, not only by a rotation of the rotor blade plane around a rotation axis running essentially in the direction of gravity, but also by swiveling the individual rotor blades about a swivel axis running roughly parallel to its longitudinal axis which is transverse, preferably approximately perpendicular to the rotor axis. At high wind speeds, damage to the wind power plants can be prevented by slowing down the rotation of the rotor around the rotor axis or, alternatively, stopping it completely and by swiveling the individual rotor blades in a predetermined parking position in which they have as little wind resistance as possible. Nevertheless, it has been shown that even after the setting of the rotor in a parking position, damage to the rotor itself, the nacelle and/or the tower can occur at high wind loads.

In one embodiment, the methods described herein reduce damage to wind power plants at high wind speeds.

In the methods, this is solved by setting in the parking position of the rotor the setting or pitch angle of at least two rotor blades at different values.

The invention is based on recognizing that by carrying out known methods at high wind loads, the observed damage is not caused by static loading of the wind power plant, but is caused by the excitation of vibrations of the rotor blades in the parking positions through the wind flow. In view of the commonly uniform design of the rotor blades, the excitation of the vibrations result in coupled oscillations with corresponding resonance phenomena which cause the observed damage.

By the setting of different setting angles for the rotor blades in the parking position, a decoupling of the vibrations in the rotor blade plane is achieved and thereby an avoidance of the otherwise occurring resonance phenomena which, finally, results in the desired reduction of damage at high wind loads. In this context, it is supplementary mentioned that the phenomenon of coupled vibrations in the operation of wind power plants with fixed setting or pitch angles at high rotational speeds as explained above has been discussed for example in EP 0 955 461 A2. In this document, a solution to this problem is suggested by a constructively different design of the rotor blades of the wind power plant. In comparison to this solution, which is meant for the operation of so-called stall-plants with a fixed setting angle of the rotor blades, the inventive solution to the above described problems when operating so-called pitch-plants with adjustable rotor blades is in particular constructively simple, since it does not require any changes to the rotor blades but only a corresponding control of the swiveling of the rotor blades in the parking position. In view of this, the inventive method can be implemented by retrofitting already existing wind power plants with comparably little effort, since a replacement of the rotor blades is not necessary.

In addition, it has been shown that in the parking position, when applying the method according to the invention, in spite of increased wind resistance of the rotor blades at deviations from the flag position, no accountable additional load of the tower, the nacelle and/or the driving rod occur.

In this context, it has been shown to be particularly useful if the pitch angle in the parking position for one rotor blade is set at a value of more than 90° and for another rotor blade at a value of less than 90°, since then they would generate opposing torque which would prevent excessive stress of the brake system which, in general, is used to secure the rotor in the parking position.

In view of a reduction of static loads by simultaneously ensuring the desired decoupling, simulation calculations with generally accepted simulation programs for wind power plants having a rotor with three rotor blades have proven that it is of particular advantage if, in the parking position, the pitch angle of a first rotor blade is set at a value in the range 80 to 89°, preferably approximately 85°, that of a second rotor blade at 88 to 92°, preferably approximately 90°, and that of a third rotor blade at a value of 91 to 100°, preferably approximately 95°.

In view of increasing the operational reliability by using the method according to the invention, it is in particular preferred if predetermined pitch angles of the rotor blades are automatically set to exceed a predetermined wind speed.

As can be deduced from the above explanations regarding methods according to the invention, a wind power plant suitable for performing such a method, with a rotor with at least two rotor blades rotatable about a common rotor axis in a rotor blade plane, a drive mechanism for setting the pitch angles of the rotor blades with respect to the rotor blade plane and a control device operable for controlling the drive mechanism, is essentially characterized in that the drive mechanism for setting different pitch angles for at least two rotor blades is controllable.

Even though the setting of different pitch angles with suitable gear transmissions is also possible with a single drive element, it has been shown in the context of this invention that it is particularly useful if the drive mechanism has at least two drive elements with which the pitch angles of two rotor blades can be set independently of one another.

For increasing the operational reliability of wind power plants according to the invention, a limit switch operable on reaching a predetermined-pitch angle with respect to the rotor blade plane is associated with each rotor blade. When operating the limit switch, the driving element associated with this rotor blade is switched off, to ensure the desired parking position is reached when there is an emergency switch off of the wind power plant. For this, each rotor blade can be associated with a control cam for; operating the limit switch, the position of which with respect to the rotor blade can be selected differently for each rotor blade corresponding to the desired pitch angle of the respective rotor blade.

As can be deduced from the above explanations, wind power plants according to the invention can be manufactured with little technical effort by simply retrofitting existing wind power plants. Thereby, the control device which is responsible for setting the pitch angle of the rotor blades is exchanged and/or the generally already present control cams for the single rotor blades are differently arranged.

Some of the above indicated and other more detailed aspects of the invention will be described in the following description and partially illustrated with reference to the figures. Therein:

FIG. 1 shows a schematic front view of a wind turbine

Figure 2:
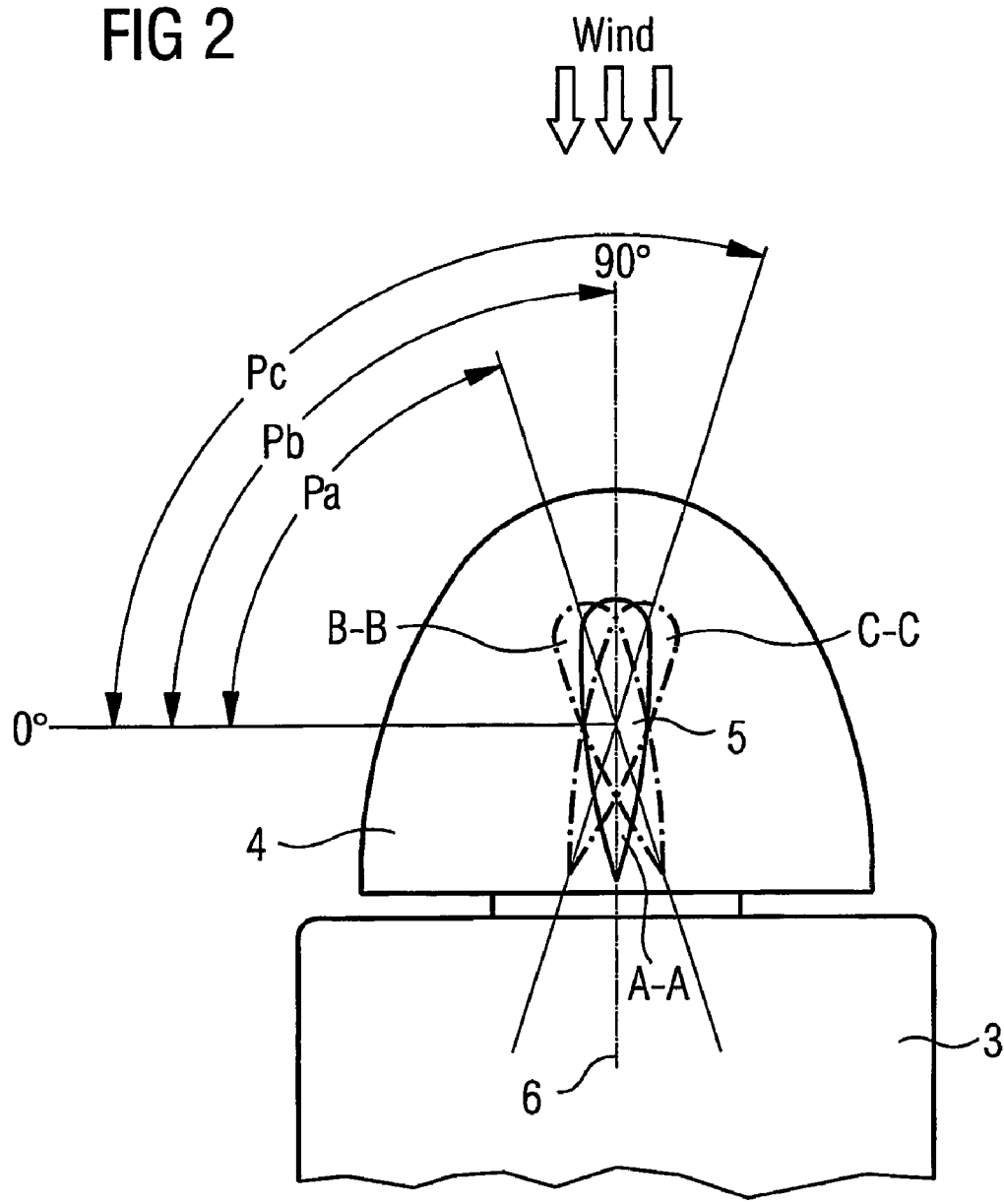
Figure 3:
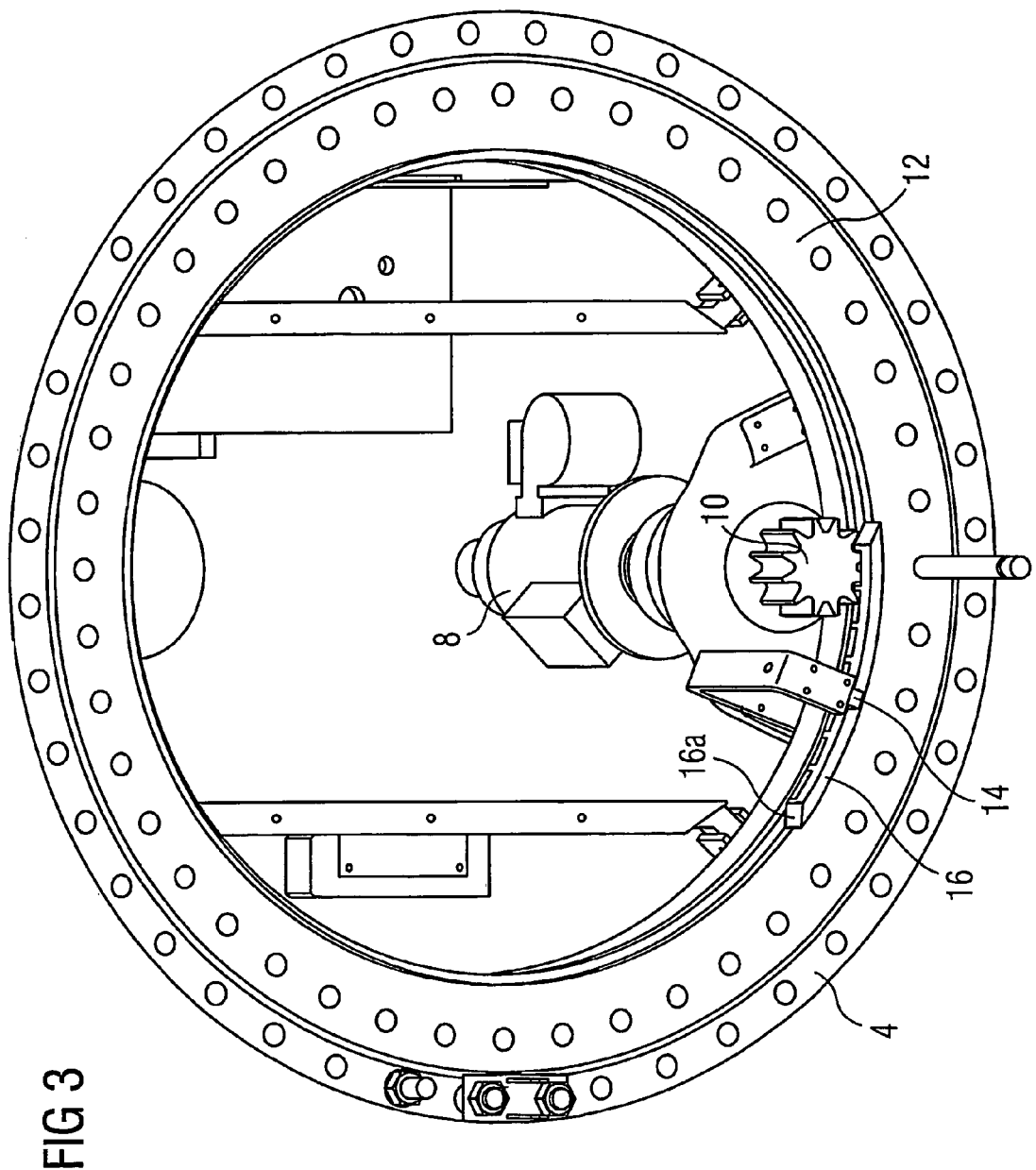
Figure 4:
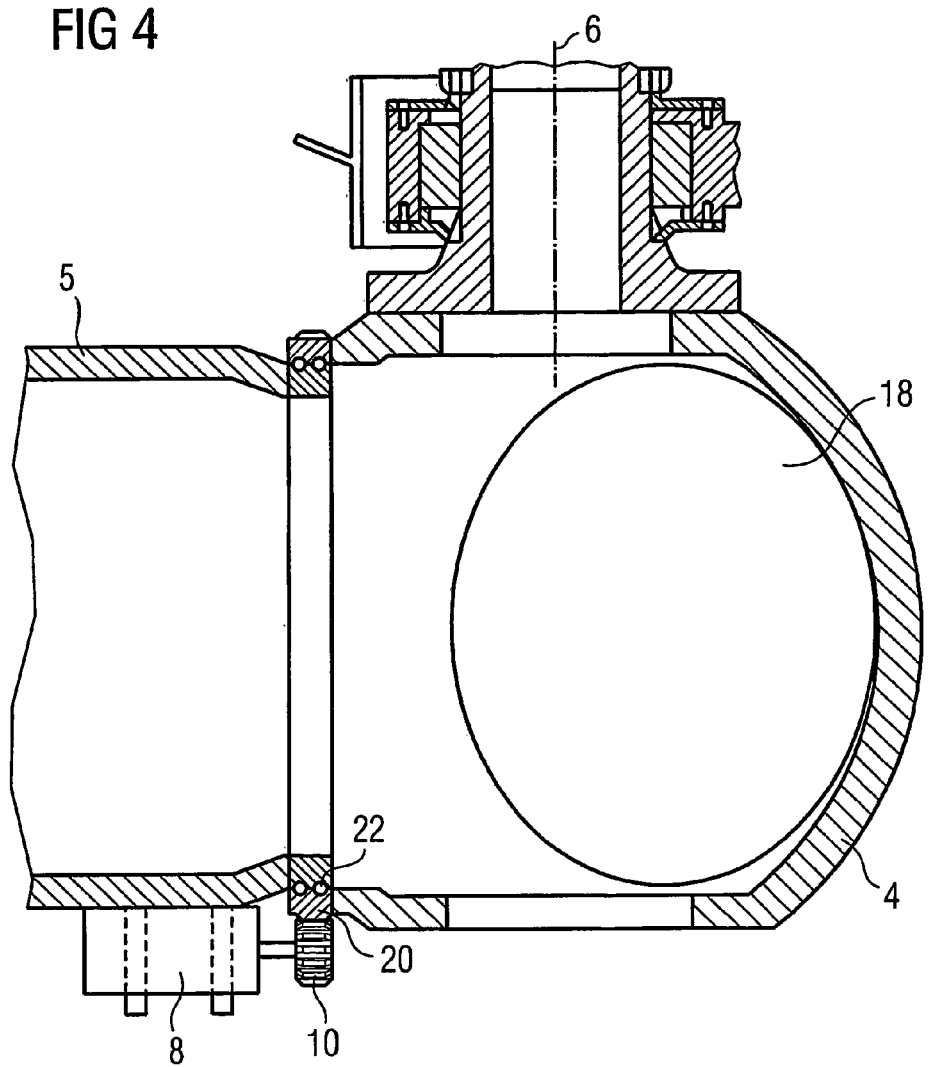
Figure 5:
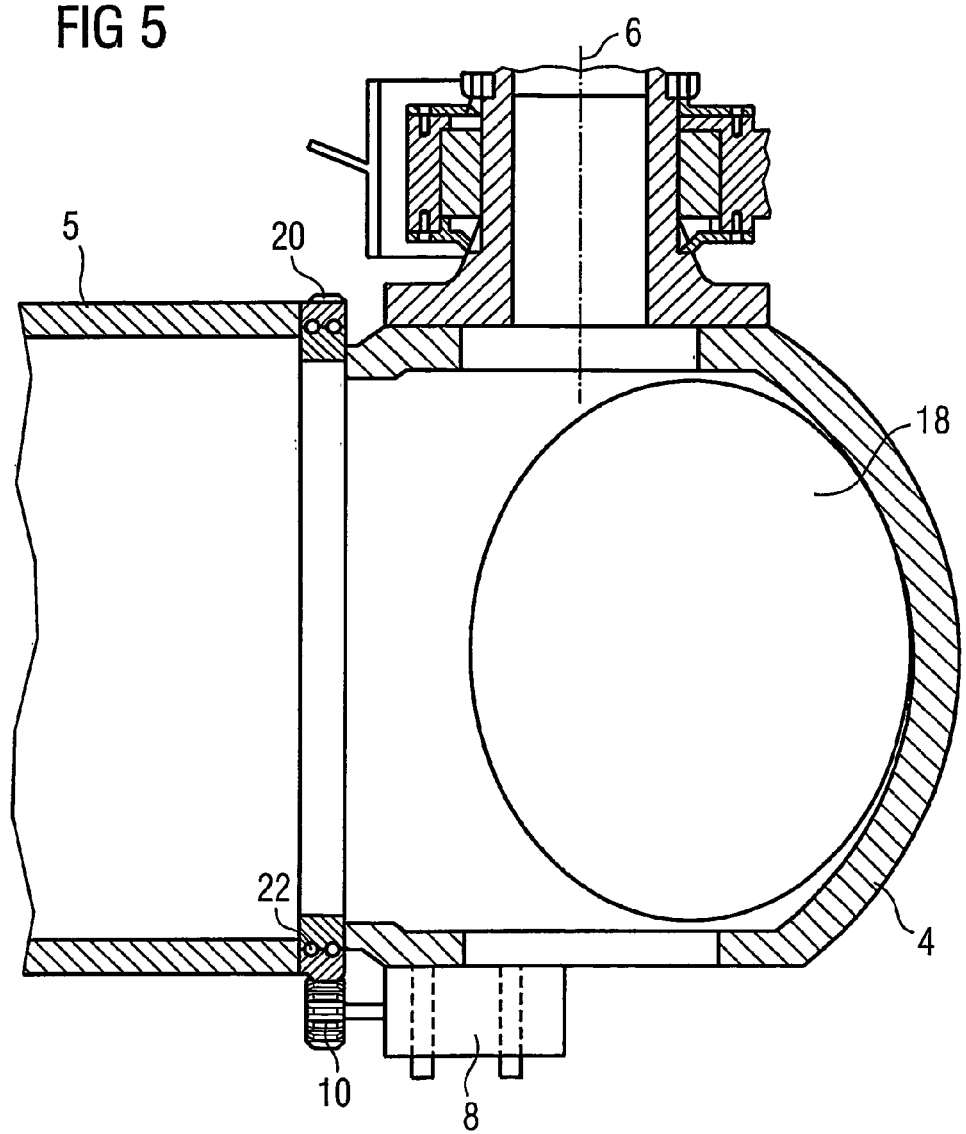
Figure 6:
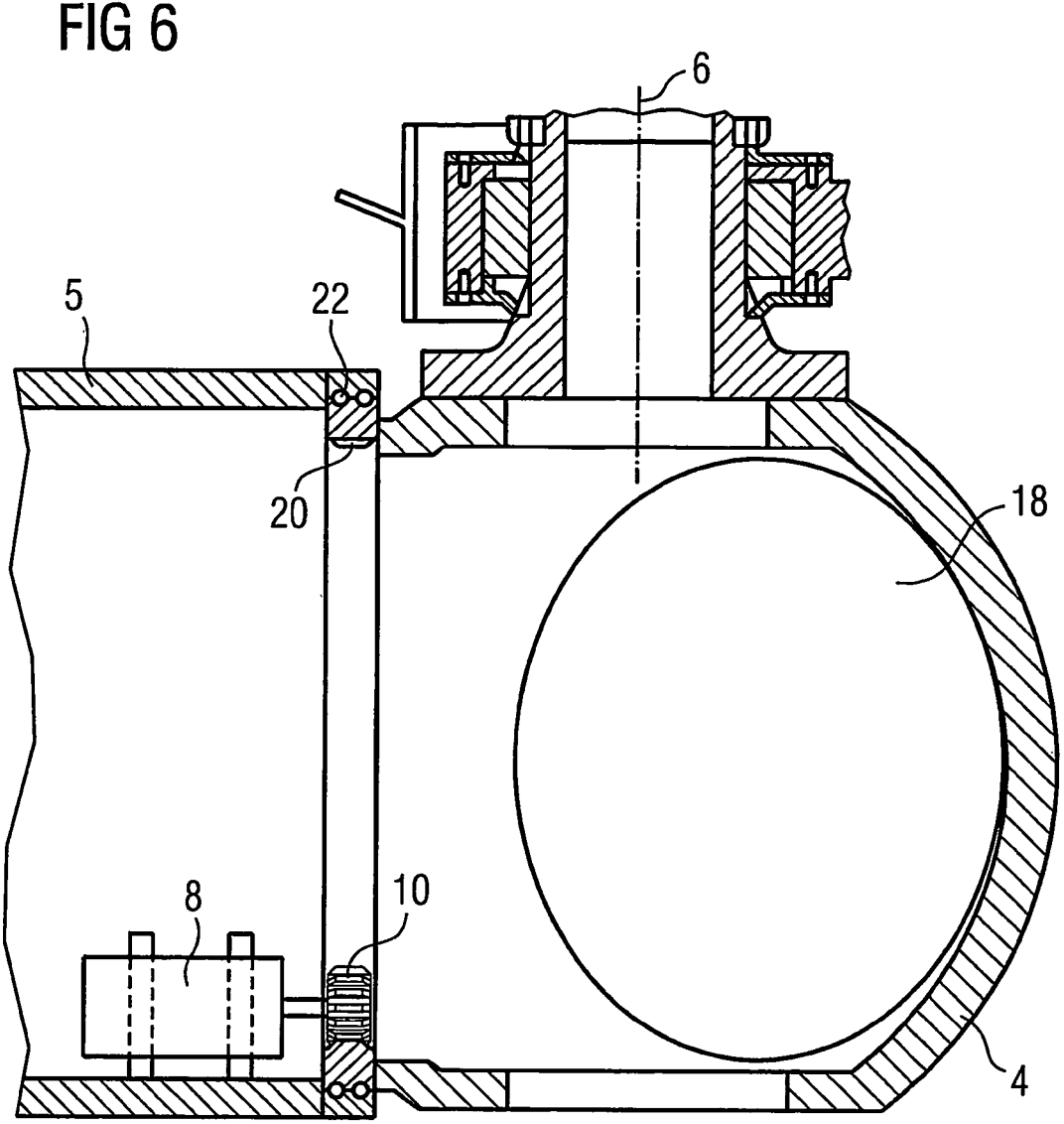
Figure 7:
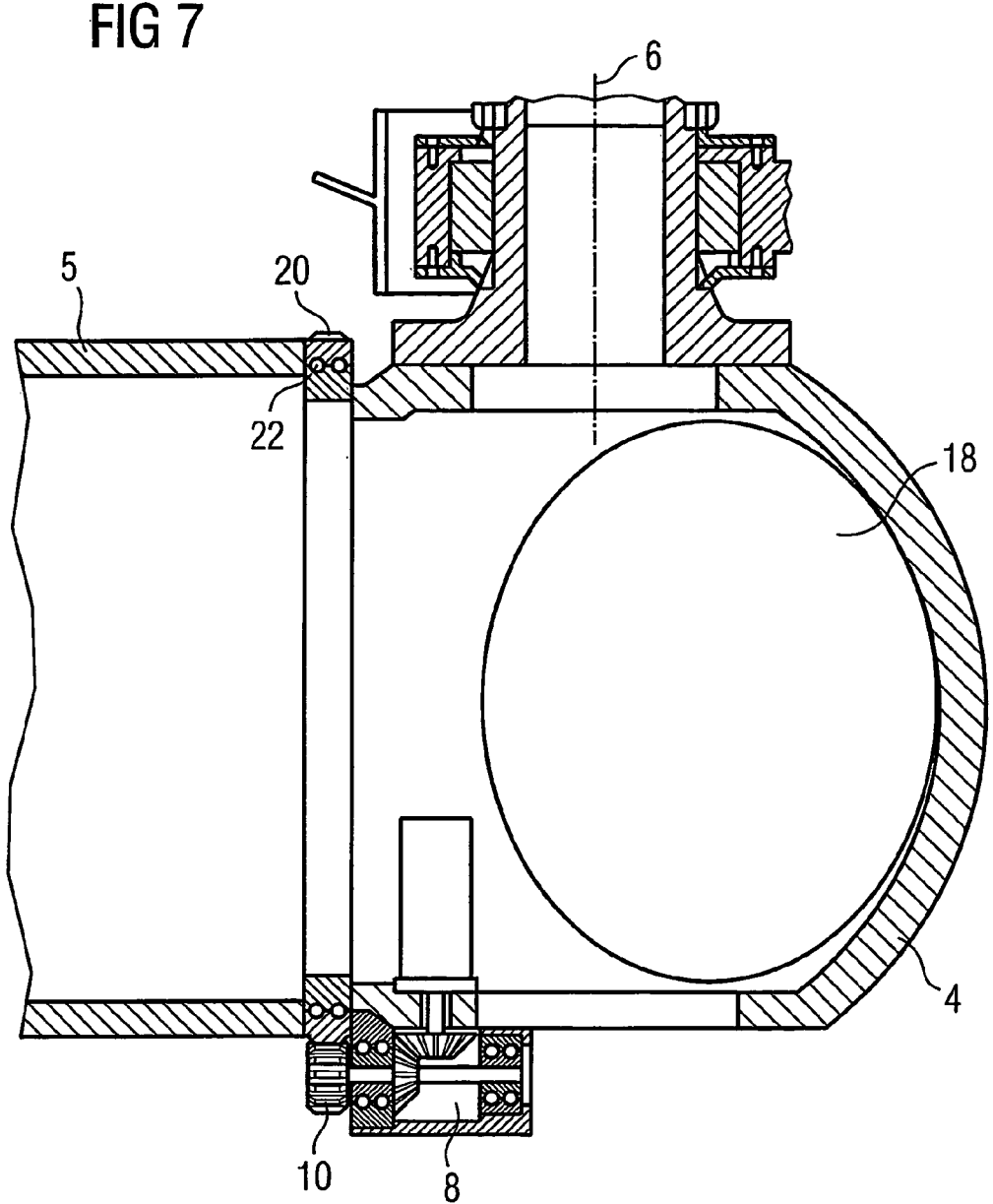
Figure 8A:
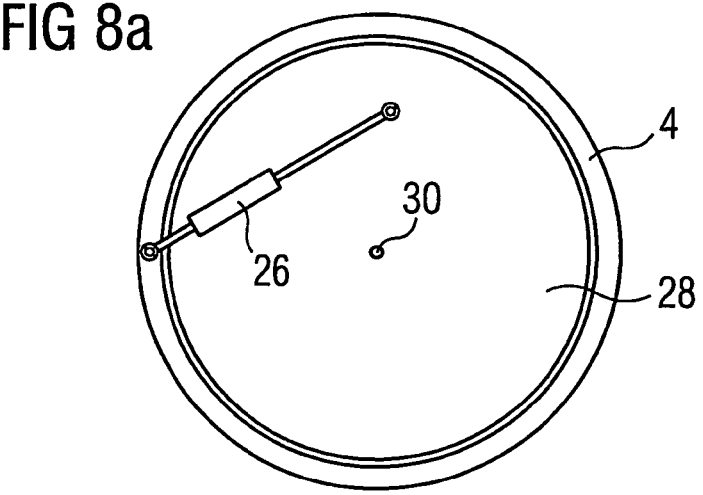
Figure 8B:
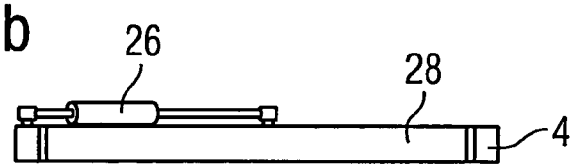
Figure 9:
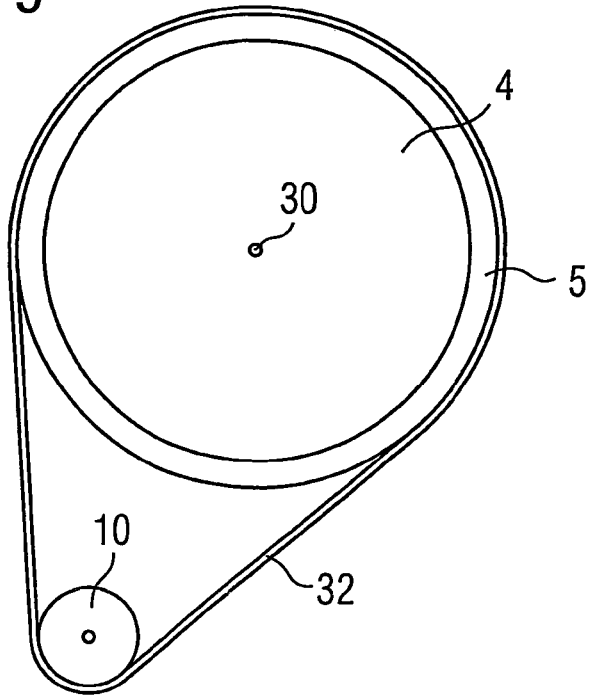

FIG. 2 shows a superimposed top side view of the wind turbine with rotor blades in an arrangement according to the invention FIG. 3 shows a front sectional view of a rotor blade bearing with a pitch drive for a rotor blade mounted inside the hub FIG. 4 shows a first arrangement for a rotor blade pitch drive FIG. 5 shows a second arrangement for a rotor blade pitch drive FIG. 6 shows a third arrangement for a rotor blade pitch drive FIG. 7 shows a forth arrangement for a rotor blade pitch drive FIG. 8a shows a bottom side view of a hydraulic pitch drive arrangement FIG. 8b shows a partial front side view of a hydraulic pitch drive arrangement FIG. 9 shows a bottom side view of a tooth belt driven pitch drive arrangement A schematic front view of a wind turbine 1 is shown in FIG. 1. The three rotor blades 5 are arranged in a rotor blade plane around the rotor hub 4 which is attached to the cabin or nacelle 3 of the wind turbine. The angle between two adjacent rotor blades is equal and, in the specific example shown, 120°. The lines A-A, B-B, C-C denote top side view along the rotor blade axis. These views are shown again in FIG. 2 which is a top side view of the wind turbine tower. Rotor axis 6 of the turbine runs perpendicular to rotor blade plane in which the rotor blades are arranged. The rotor hub 4 is rotatable and attached to nacelle 3. On top of rotor hub 4 side sectional views of all three rotor blades along lines A-A, B-B and C-C are shown. Each sectional view represents the moment at which the respective rotor blade has reached its top position.

In the inventive parking position shown in FIG. 2, rotor blade A-A is approximately parallel to the wind direction. This means the rotor blade is set at a pitch angle of about 90°. Contrary to this, the pitch angle of rotor blade B-B is smaller than 90° and the pitch angle of rotor blade C-C is bigger than 90°. According to one aspect of the invention, the deviation of rotor blades B-B and C-C from the A-A line are opposing to each other. They can be equal in size but they can also be different.

FIG. 3 shows a perspective view of a rotor blade bearing flange of the rotor hub with a removed blade. The pitch drive 8 which is firmly fixed to rotor hub 4 is mounted inside the hub. Drive element 10 of pitch drive 8 is a gear wheel which interacts with the inner gear rim of flange 12. Flange 12 which is firmly attached to a rotor blade is rotatably located within rotor hub 4. Thus, pitch drive 8 enables a swiveling movement of its corresponding rotor blade whereby the swivel axis of the rotor blade is roughly parallel to the longitudinal axis of the blade. FIG. 3 further shows a limit switch 14 which is activated by control cam 16. In the specific embodiment shown, control cam 16 is connected to rotatable flange 12 of the rotor blade. It is assumed that the rotor blade is turned clockwise. Thus, in FIG. 3 the front end 16a of control cam 16 has already passed limit switch 14. The operation of the limit switch 14 interacting with the control cam 16 is explained subsequently in more detail. At a first stage, it is assumed that the control cam is located in a position where it has not yet engaged with the limit switch. If, for example, flange 12 of the rotor blade is viewn as clock, control cam 16 would e.g. be located roughly between 4 and 5 o'clock. The activation of pitch drive 8 will cause gear wheel 10 to rotate and, consequently, will cause flange 12 to turn clockwise towards 7 o'clock. After the front end of control cam 16a contacts limit switch 14, the pitch drive will be switched off. Depending on the mass of the rotor blade and the setting of various operating parameters, the rotor blade will not come to an instantaneous halt but could continue to move for a little while. This is not obligatory but depends primarily on the setting of the control device which operates the pitch drive. There are of course many other ways known in the art of wind turbines to activate or operate limit switches. All these ways of operating limit switches can be used within the disclosed invention. FIG. 3 only shows one example of a possible embodiment Also, in FIG. 3 each rotor blade has its own independent pitch drive. Alternatively, it is known in the art to have two or more rotor blades being operated by one same drive mechanism It is also possible to have more than one drive for each blade.

FIGS. 4 to 7 show a variety of options to arrange rotor blade 5, pitch drive 8 and rotor hub 4 with respect to each other. FIGS. 4 to 7 are sectional views of the rotor perpendicular to the rotor blade plane. Rotor hub 4 is attached to rotor axis 6 of the rotor. One rotor blade extends to the left side of the rotor hub. Opening 18 shows the flange opening at an angle of 120°. Onto this opening, the other rotor blade is attached but not shown in this sketch due to simplification. The rotor blade shown is connected with rotor hub 4. In FIG. 4, the rotor blade is attached to the inner sides of the openings 18 of the rotor hub. Pitch drive 8 is connected to rotor blade 5 and its drive element 10 interacts with an outer gear rim 20 of hub 4. Between the rotor blade flange and the rotor hub flange, bearing 20 allows a rotational movement of the rotor blade.

In FIG. 5, the inner end of the rotor blade encompasses a projecting portion of rotor hub 4. Pitch drive 8 is attached to rotor hub 4 and swivels the rotor blade by interacting with an outer gear rim 20 of rotor blade 5. Alternatively, pitch drive 8 can be arranged within rotor blade 4 and interacts with an inner gear rim 24 of rotor hub 4 as shown in FIG. 6. FIG. 7 shows again a different arrangement of a pitch drive for a rotor blade.

FIGS. 8a and 8b show hydraulic pitch drives. Hydraulic pitch drive 26 is connected at one end with the rotor hub and at the other end hydraulic pitch drive 26 is connected with a plate 28 of the rotor blade. The eccentric arrangement of the hydraulic pitch drives causes the rotor blade to turn with respect to rotor hub 4. FIG. 9 shows a tooth belt driven pitch drive which causes a rotor blade having an inner end encompassing a projecting portion of a rotor hub to turn the rotor blade around rotor hub 4.

Here again, all know pitch drives in the art of wind turbines can be used to implement the invention Thereby it is only important to modify the control unit or some of the mechanical parts so that it is possible for the drive mechanism to set the pitch angle of at least two rotor blades at different pitch angles.

The invention claimed is:

1. A wind power plant comprising:
   at least two rotor blades rotatable about a common rotor axis in a rotor blade plane;
   a drive mechanism for setting the pitch angles of the rotor blades with respect to the rotor blade plane; and
   a control device operable for controlling the drive mechanism, wherein the drive mechanism is controllable for setting different pitch angles for at least two rotor blades, wherein the control device is operable to swivel a first rotor blade about a swivel axis running approximately parallel to its longitudinal axis that is approximately perpendicular to the rotor axis to set the first rotor blade at a first pitch angle with respect to the rotor blade plane, to swivel a second rotor blade about the swivel axis to set the second rotor blade to a second pitch angle that is different than the first pitch angle, and to swivel a third rotor blade about the swivel axis to set the third rotor blade to a third pitch angle that is different than the first and second pitch angles.

2. The wind power plant according to claim 1, wherein the drive mechanism has at least two drive elements with which the pitch angles of two rotor blades can be set independently of one another.

3. The wind power plant according to claim 1 or 2, wherein with each rotor blade is associated a limit switch operable on reaching a predetermined pitch angle and coupled to the drive element associated with said rotor blade.

4. The wind power plant according to claim 3, wherein a control cam for operating the limit switch is associated with each rotor blade.

5. The wind power plant according to claim 4, wherein the power plant comprises exactly three rotor blades, and wherein the control device is operable to swivel a third rotor blade about the swivel axis to set the third rotor blade at a third pitch angle.

6. The wind power plant according to claim 1, wherein the power plant comprises exactly three rotor blades.

7. A method for operating a wind power plant with a rotor having at least two rotor blades rotatable in a rotor blade plane about a common rotor axis, comprising:

setting a first rotor blade and a second rotor blade of the at least two rotor blades in a parking position;

swiveling the first rotor blade about a swivel axis running approximately parallel to its longitudinal axis that is approximately perpendicular to the rotor axis, wherein the first rotor blade is swiveled to have a first pitch angle of the rotor blade with respect to the rotor blade plane as a function of the operating conditions;

swiveling the second rotor blade about the swivel axis, wherein the second rotor blade is swiveled to have a second pitch angle of the rotor blade with respect to the rotor blade plane as a function of the operating conditions, and wherein the second pitch angle is a different angle than the first pitch angle; and swiveling a third rotor blade about the swivel axis, wherein the third rotor blade is swiveled to have a third pitch angle of the rotor blade with respect to the rotor blade plane as a function of the operating conditions, and wherein the third pitch angle is different than the first and second pitch angles.

8. The method of claim 7, wherein the first and second pitch angles are selected to decouple vibrations in the rotor blade plane.

9. The method of claim 7, wherein the first pitch angle is greater than 90°, and the second pitch angle is less than 90°.

10. The method of claim 7 or 9, wherein the first pitch angle is between an approximate range of 91° to 100°, and the second pitch angle is between an approximate range of 80° to 89°.

11. The method of claim 7, wherein the first pitch angle is between an approximate range of 80° to 89°, the second pitch angle is between an approximate range of 91° to 100°, the third pitch angle is between an approximate range of 88° to 92°.

12. The method of claim 7, further comprising automatically setting the first and second pitch angles for the rotor blades when a predetermined wind speed is exceeded.

* * * * *